United States Patent [19]

Foster et al.

[11] 4,389,586

[45] Jun. 21, 1983

[54] ELECTRIC WHEEL WITH REMOVABLE MOTOR

[75] Inventors: David L. Foster, North East; John F. Haupt; Malcolm W. Waite, both of Erie, all of Pa.

[73] Assignee: General Electric Company, Erie, Pa.

[21] Appl. No.: 350,832

[22] Filed: Feb. 22, 1982

[51] Int. Cl.³ .......................... H02K 7/00; B60K 7/00
[52] U.S. Cl. ..................................... 310/67 R; 310/83
[58] Field of Search .............. 310/67 R, 83, 90, 69 R, 310/42, 75, 258, 259, 256, 89; 180/242, 65.5; 105/137, 140

[56] References Cited

U.S. PATENT DOCUMENTS

| | | | |
|---|---|---|---|
| 2,430,163 | 11/1947 | Dever | 310/67 R |
| 2,608,598 | 8/1952 | Hawkins et al. | 310/67 R |
| 2,650,992 | 9/1953 | Forss et al. | 310/258 |
| 2,727,164 | 12/1955 | Radice | 310/258 |
| 2,822,485 | 2/1958 | Braun et al. | 310/258 |
| 2,899,005 | 8/1959 | Speicher | 310/67 R |
| 3,897,843 | 8/1975 | Hapeman et al. | 180/65.5 |
| 4,021,690 | 5/1977 | Burton | 310/67 R |

Primary Examiner—J. D. Miller
Assistant Examiner—D. L. Rebsch
Attorney, Agent, or Firm—Albert S. Richardson, Jr.

[57] ABSTRACT

The magnet frame of a dynamoelectric machine comprises a removable, generally cylindrical inner member concentrically disposed inside a cylindrical outer member. The inner member is supported in a cantilever fashion at only one of its ends, and most of its outside surface is normally separated by a relatively small circumferential gap from the cooperating inside surface of the outer member. The outer member of the frame rotatably supports the hub of a motorized wheel, which hub is coupled via a torque tube and gearing to a rotor inside the inner member. Conventional means is provided in the inner member for producing a field of magnetic flux in both the magnet frame and the rotor, and the path of this flux will include parallel branches in the inner and outer frame members.

11 Claims, 10 Drawing Figures

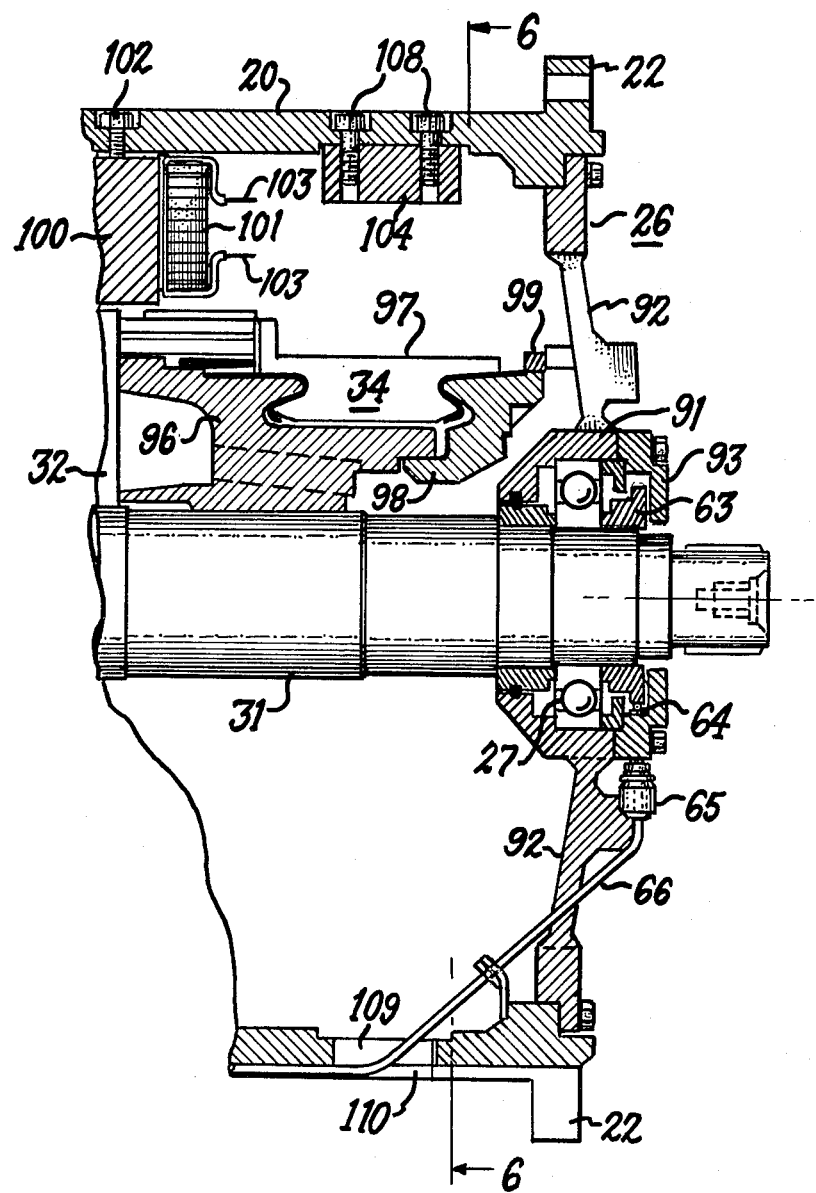

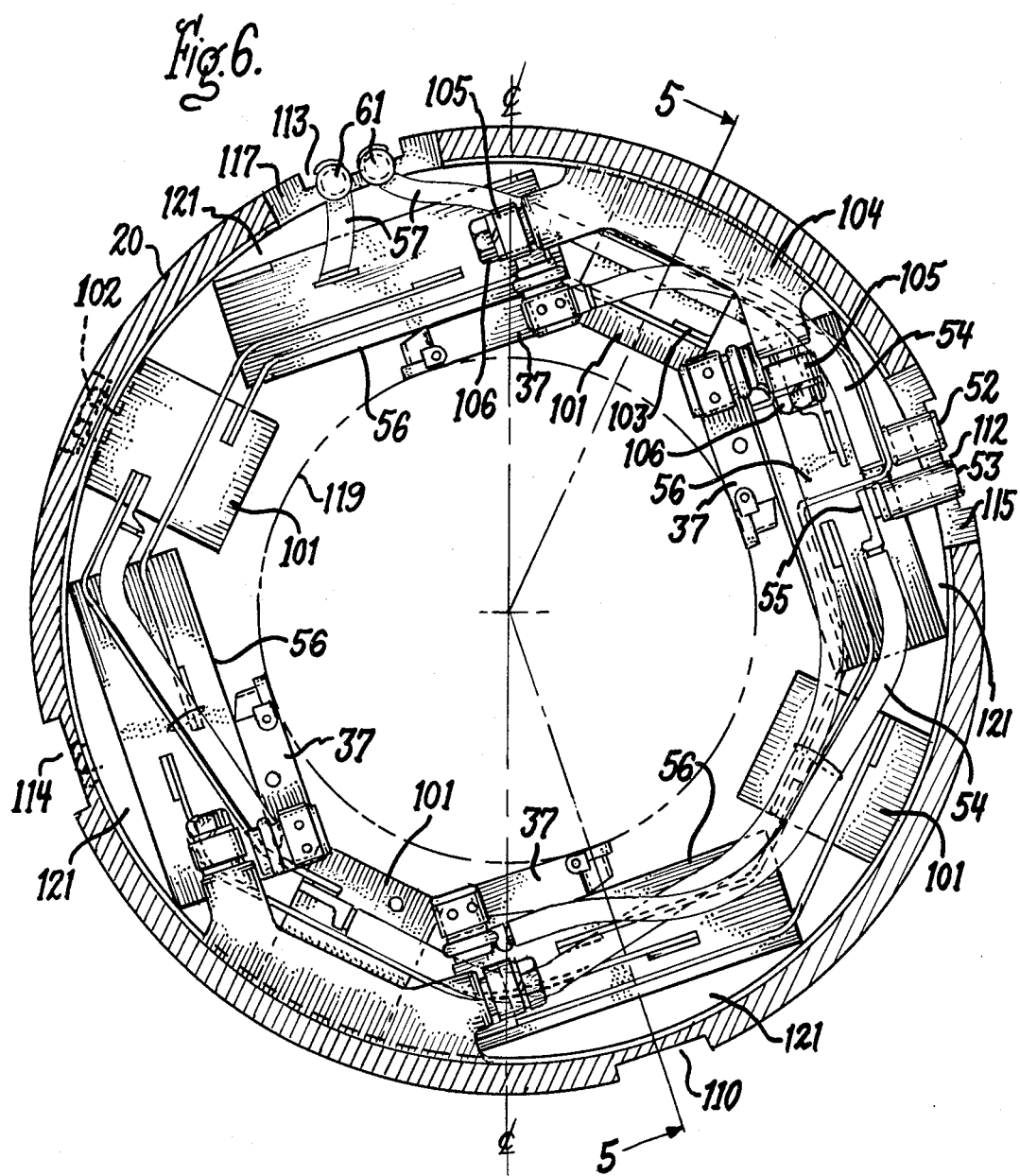

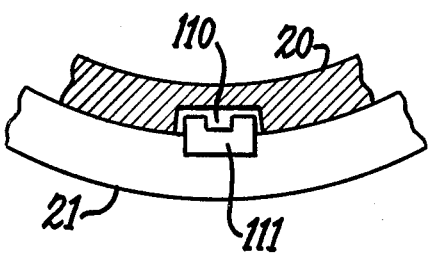
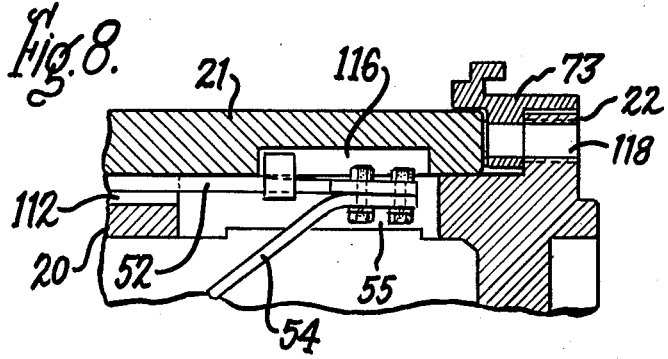
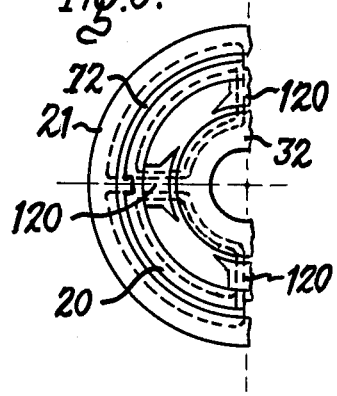
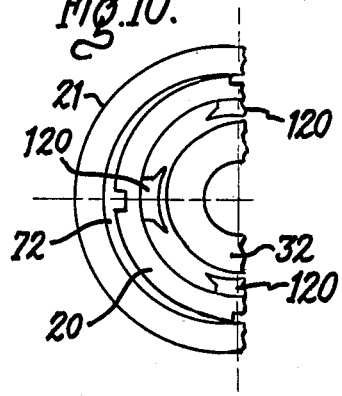

ELECTRIC WHEEL WITH REMOVABLE MOTOR

BACKGROUND OF THE INVENTION

This invention relates generally to electrodynamic machines and more particularly to such a machine for powering an electric motorized wheel on an off-highway truck of the type used to haul heavy payloads in open pit mines.

Motorized wheels are useful on large off-highway traction vehicles for propelling or retarding the vehicle in an energy efficient manner. In such a wheel the magnet frame or stator of a cylindrical electric traction motor serves as a non-rotating axle for the wheel. The stator is suitably affixed to the frame or body of the vehicle, and it rotatably supports the wheel hub on which is mounted at least one large pneumatic tire. Transmission of power is accomplished by a speed-reducing gear train and a torque tube connected between the rotor of the motor and the coaxial hub of the wheel. A mechanism of this type is shown and described in U.S. Pat. No. 2,899,005—Speicher. In such a wheel, the gear train, which typically comprises a sun pinion and three planet gears, is housed in a gear case on the inboard side of the wheel (i.e., the side next to the body of the vehicle). In the motor, which is usually a direct current (d-c) type, a commutator and associated brushes are used to supply electric current to armature windings on the rotor, and since these parts require periodic inspection and maintenance, the commutator and brushes are located so as to be accessible from the outboard side of the wheel.

In the Speicher wheel, the rotor of the motor can be readily removed from the outboard side for servicing or replacement, as needed. However, it is more difficult to service the pole pieces, field coils, and brush holders of the motor because they are attached to the stator which cannot be removed in the Speicher wheel without first removing the whole wheel from the vehicle and disassembling the pneumatic tire and other major components. For more convenient servicability, it is desirable to construct a motorized wheel so that the motor stator and all of the parts assembled therewith are removable as a unit without disassembling the hub of the wheel from the vehicle.

In another prior art motorized wheel, the motor plugs into a cylindrical member or barrel which in turn rotatably supports the hub of the wheel, whereby the whole stator assembly of the motor can be removed from the outboard side of the wheel. With the stator assembly locked in place inside the barrel, there is a tight interference fit between its outside circumference and the cooperating inside surface of the barrel. Whenever the motor is removed from the wheel and the wheel is not removed from the vehicle, the barrel alone carries the wheel's proportionate share of the vehicle's weight. The referenced arrangement is disadvantageous because of the possibility that the stator will become stuck inside the barrel due to fretting or corrosion. Furthermore, the removable stator is not utilized for the dual purposes of both providing the magnet frame of the motor and supporting the weight of the vehicle. Consequently the additional barrel of this prior art motorized wheel contributes undesirably to the size and manufacturing cost of the wheel and to the non-payload weight of the vehicle.

SUMMARY OF THE INVENTION

A general objective of the present invention is to provide an improved motorized wheel wherein an electric motor is coaxially mounted inside the hub of the wheel and its stator assembly is removable in situs.

Another objective is to provide a motorized wheel having a removable motor arrangement which minimizes the possibility of the motor seizing in the hub of the wheel and which does not appreciably add to the weight, size or cost of the wheel.

In carrying out this invention in one form, we provide a dynamoelectric machine having a stator yoke comprising an inner hollow cylindrical member nested generally concentrically inside an outer cylindrical member of larger diameter. Both of the inner and outer members are made of magnetizable material. An annular flange at one end (hereinafter referred to as either the "proximal end" or the "outboard end") of the inner member is bolted to the corresponding end of the outer cylindrical member, whereby the inner member is removably mounted as a cantilever in the outer member. The other end of the outer member is adapted to be secured to the frame of a traction vehicle such as a large capacity off-highway haulage truck, and a wheel of the truck is rotatably supported on the outside of this member. Bearings supported coaxially at opposite ends of the inner member hold the shaft of a rotor, and this shaft is mechanically coupled via a speed-reducing gear train and a large-diameter torque tube to the annular hub of the wheel. A plurality of pairs of pole pieces are mounted inside the inner member in spaced relation to armature windings on the rotor, and field excitation means is provided for producing magnetic flux in each of the pairs of pole pieces. The regions of the stator yoke between associated pole pieces provide paths for the magnetic flux.

The aforesaid inner and outer members of the stator yoke are so constructed and arranged that, with the exception of a predetermined section of the inner member at its proximal end, the circumference of the inner member is normally separated by a relatively small gap from the inside surface of the outer member. Consequently the inner member fits snugly in the outer member in the vicinity of its proximal end but normally floats inside the outer member in the vicinity of its distal end. The inner member has a relatively thin wall, and preferably it has a tapered profile for ease of installation and removal. The taper is provided by progressively decreasing the outside diameter of the inner member from a place near its proximal end to its distal end. The bore of the outer member is corrrespondingly tapered. The gap that normally exists between inner and outer members of the stator yoke is intended to ensure that the inner member will not become seized or stuck in the outer member. Yet the gap is so small that it does not appreciably interfere with the lines of magnetic flux following a circuit including parts of both the inner and the outer members.

The cylindrical wall of the inner member of the stator yoke is so thin that the cross-sectional area of this member by itself is insufficient to provide the necessary magnetic flux path when the machine is operating either at its maximum continuously rated load or under temporary overload conditions. Furthermore, the outer member also has a relatively thin wall, and its cross-sectional area by itself is insufficient to provide the necessary physical strength to carry the wheel's proportionate share of the weight of the truck when the truck is fully loaded or temporarily overloaded. Nevertheless, with the inner member nested inside the outer member, the cross-section of the combination of these two members is adequate for both magnetic and strength purposes under full load conditions.

Whenever the whole stator yoke of this invention is installed in a wheel of a loaded truck, the cylindrical wall of the outer member of the yoke is vertically deflected by the reaction of the wheel hub. This tends to flatten the outer member. The normal gap between outer and inner members is so small that a small deflection of the outer wall will cause it to converge on the bottom and top of the inner member which then serves to stiffen or reinforce the stator assembly, thereby limiting further deformation of the outer member. The combined thickness of the juxtaposed walls of the inner and outer members is sufficient to prevent excessive out-of-round distortion of these members. In this fully loaded, deflected state, the cross section of the outer member will be slightly elliptical, with the major axis of the elipse being horizontally oriented. At the top as well as at the bottom of the stator yoke the walls of the cooperating inner and outer members will now be in contact with one another, and in these particular regions there is no gap therebetween. However, a gap remains between the respective members at each side of the stator yoke.

The inner member of the stator will never be removed from the wheel unless the truck is virtually empty, and the relatively thin wall of the outer member is sufficiently strong by itself to carry the proportionate share of the weight of an unloaded truck, which share is much less than (e.g., 30 percent) the weight that the wheel supports when the truck is fully loaded.

In operation, the field excitation means produces magnetic flux in the regions of the stator yoke between associated pole pieces. The flux path between pole pieces includes parallel branches in the inner and outer members, respectively. A substantial portion of the flux in each of the paths at the opposite sides of the stator yoke will traverse the gap that remains between the inner and outer members in these areas and will follow the branch in the outer member, thereby avoiding magnetic saturation of the inner member. It will now be apparent that the inner and outer members of the stator yoke are able in concert to perform the dual functions of supporting the weight of the vehicle and providing a path for the magnetic field. In other words, with the inner member mounted inside the outer member, these two members cooperate in a synergistic manner to provide the necessary support for the truck and the necessary magnetic flux path. Both members are needed in combination to provide enough cross section to carry all of the forces and all of the flux that will exist when a fully loaded truck is moving at full horsepower. To repair or maintain the machine, only the inner member is removed; the outer member can remain attached to the truck frame, and it is sufficiently strong to support the wheel's proportionate share of the weight of an empty truck.

The invention will be better understood and its various objects and advantages will be more fully appreciated from the following more detailed specification, of which the appended claims and Abstract and the accompanying drawings form a part.

BRIEF DESCRIPTION OF THE DRAWINGS

FIGS. 5 and 6 are longitudinal and transverse sections, respectively, of the commutator end of the removable inner cylindrical member of the stator yoke;

FIG. 7 is an enlarged end view of a portion of the stator yoke, which view is taken through a section of the inner member just behind the flange at its outboard end;

FIG. 8 is an enlarged longitudinal section of a portion of the stator yoke in the vicinity of the outboard end of its inner and outer cylindrical members;

FIG. 9 is a schematic structural diagram of one-half of the stator yoke;

FIG. 10 is a diagram similar to FIG. 9 under conditions of full mechanical load on the axle.

DESCRIPTION OF THE PREFERRED EMBODIMENT

Figure 1:
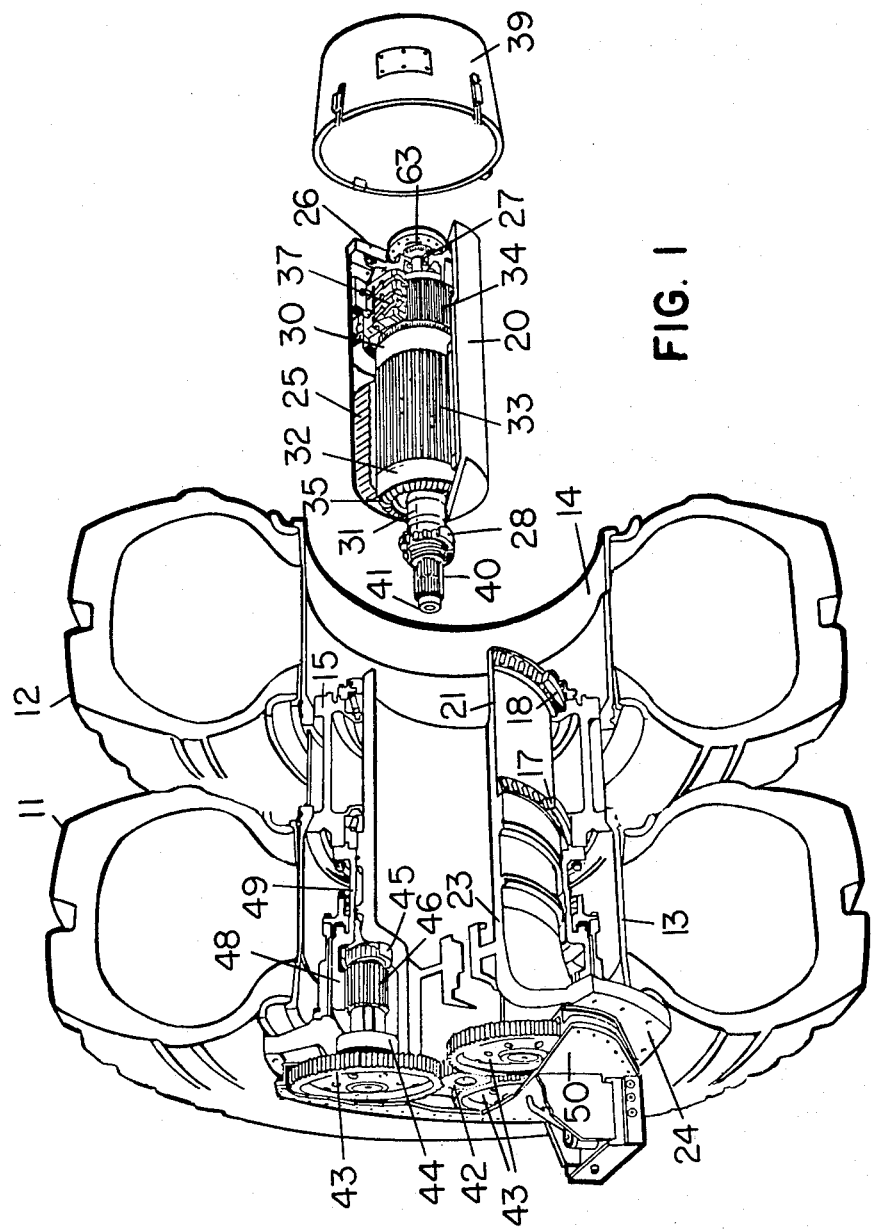
FIG. 1 is an exploded isometric view, partly broken away, of an electric wheel equipped with the removable motor of this invention.

FIG. 1 shows in somewhat simplified form a motorized wheel comprising a pair of large pneumatic tires 11 and 12 respectively mounted on rims 13 and 14 which in turn are affixed to an annular hub 15. The wheel hub 15 is rotatably supported on a pair of spaced apart, large annular bearing assemblies 17 and 18 comprising tapered roller bearings, which assemblies are carried on the outside of a barrel-like stator yoke of a high-horsepower dynamoelectric machine. This machine has a motoring mode of operation in which it converts electric power into mechanical energy, and it will hereinafter be referred to as a motor. It also has an alternative "dynamic retarding" mode of operation in which it acts as a generator and converts kinetic energy to electric energy which is dissipated in resistor grids (not shown).

In accordance with the present invention, the stator yoke assembly inside the wheel hub 15 comprises generally concentric inner and outer hollow cylindrical members 20 and 21 of magnetizable material. The outer member 21 has a relatively large inside diameter (e.g., nearly three feet). The inner member 20, which is shown removed from the outer member 21 in FIG. 1, has a smaller diameter than the outer member, and in operation it nests inside of the outer member where it is held in place by bolting an annular flange on the outboard end of the inner member (see reference No. 22 in FIGS. 3 and 4) to the corresponding end of the outer member.

The inboard end of the outer member 21 of the stator yoke assembly is an integral part of a frame structure 23 having a flange 24 which is bolted to one side of the rear axle box of a large vehicle (not shown) such as a 225-ton off-highway haulage truck, thereby securing the illustrated wheel to the truck frame. In practice a similar wheel is attached to the opposite side of the same axle box, and the two wheels work in unison to electrically propel or retard the truck.

The inner member 20 of the stator yoke of the illustrated d-c motor has a plurality of pairs of radially extending pole pieces 25 mounted inside it. A frame head 26 is detachably bolted to the outboard end of the member 20, and it centrally supports a ball bearing assembly 27. A roller bearing assembly 28 is housed in the hub of spoke-like struts (see reference No. 29 in FIGS. 3 and 4) which are affixed to the perimeter of the inboard end of the same member. The coaxial bearings 27 and 28 provide rotatable support for the shaft 31 of a rotor 30 which is concentrically disposed within the bore of the inner member 20 of the motor.

The rotor 30 comprises a hollow cylindrical core 32 of magnetizable material and a conventional commutator 34. The core 32 has a slotted section 33 for armature windings spaced by a short air gap from the concave faces of the pole pieces 25 in the inner member 20. A plurality of electrical coils 35 in the slots of the armature are connected to the commutator segments, and stationary brushes (see reference No. 36 in FIG. 4) make sliding contact with the segments, all in a conventional manner. FIG. 1 shows the brush holders 37 which are bolted inside the inner member 20 of the stator yoke. A vented hub cap 39 can be attached by releasable spring clamps to the outboard end of the outer member 21 of the stator yoke.

Although a d-c type of motor is shown and described in the presently preferred embodiment of the invention, an alternating current type of motor can alternatively be used, in which case the pole pieces would be mounted on the rotor core 32, the armature section of the motor would be attached to the inner member 20 of the stator yoke in spaced relation to the convex faces of the rotating pole pieces, and slip rings would replace the commutator 34 on the rotor shaft.

With the inner member 20 inserted in the outer member 21 of the stator, the shaft 31 of the rotor 30 is mechanically coupled via a splined drive ring 40 to the hollow shaft 42 of a sun pinion 42 which meshes with three surrounding planet gears 43. Each planet gear in turn is affixed to a shaft that is rotatably supported by a pair of spaced-apart bearings 44 and 45. The latter bearings are mounted in the non-rotating frame structure 23 of the wheel, and the planet shaft has a pinion 46 between these bearings. The planet pinion 46 engages the teeth of an internal ring gear 48 on the inboard end of a large-diameter torque tube 49 whose other end is bolted to the wheel hub 15 for rotation therewith. The planet and ring gears form a double-reduction gear train (sometimes referred to as a "compound star" epicyclic gear drive system) between the motor rotor and the torque tube. A cover 50 encloses the gear train which is immersed in oil.

The coaxial assembly of the inner and outer members 20 and 21 of the stator yoke, the rotor 30, the rotor shaft 31, the gear train 41–48, and the torque tube 49 serves as a truck axle, transmission, and traction motor to rotate the wheel hub at the desired speed and in the desired direction. Although not shown in FIG. 1, in practice the motorized wheel will also include a suitable mechanical brake and conventional means for forced ventilation of the gear case, the bearings, and the motor windings.

Figure 2:
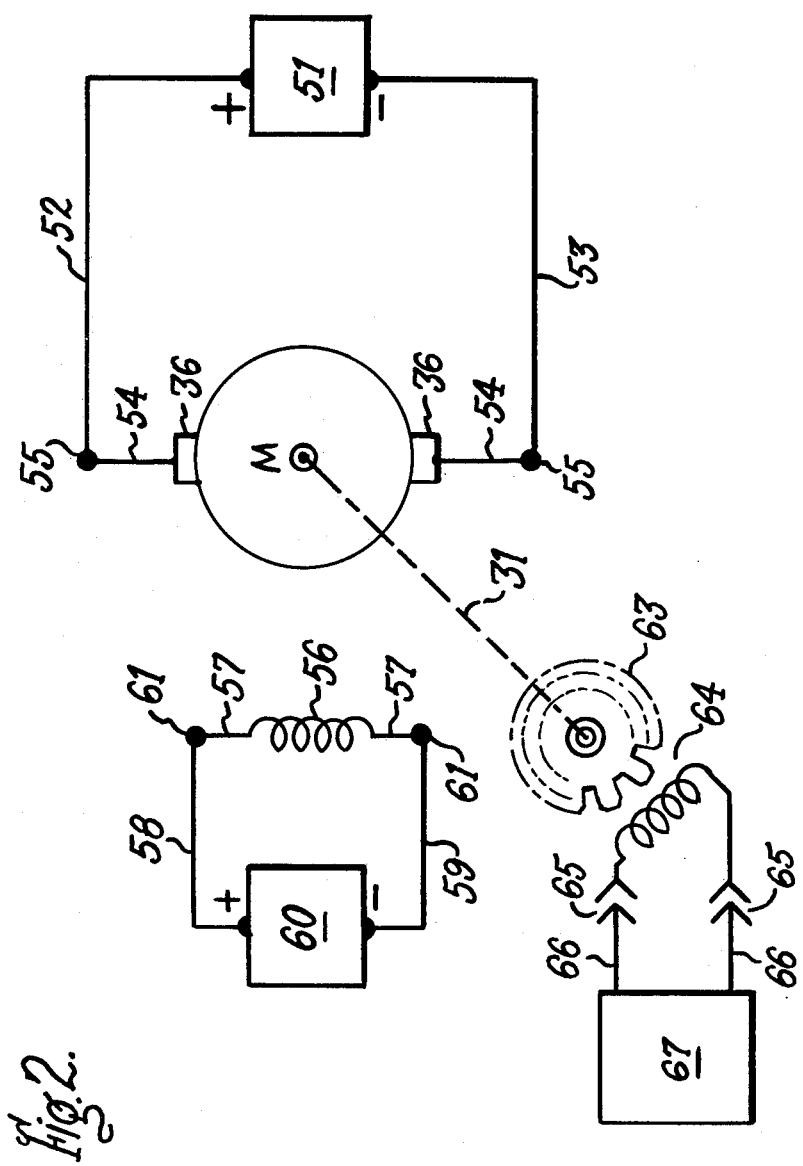
FIG. 2 is a schematic electric circuit diagram of the preferred embodiment of the motor.

To power and to control the motor in the illustrated wheel, the truck on which the wheel is mounted includes prime motor-driven electric power generating means (not shown) which supplies direct current via the brushes 36 and the commutator 34 to the armature windings 35 on the rotor 30. The field coils on the pole pieces mounted inside the inner member 20 of the stator yoke are also supplied with direct current, either in series with armature current or from a separate source of excitation. These electrical connections are shown in FIG. 2 where the block 51 represents a suitable source of current for the coils (35) on the rotating armature (32,33) of the d-c motor M. The armature current is carried between the external source 51 and the commutator brushes 36 of the motor by means of a pair of conductors 52 and 53 which are respectively connected to the brush cables 54 at junction points 55. A magnetic field is produced in each of at least two pairs of pole pieces by supplying current to multiple-turn exciting field coils (shown schematically at 56 in FIG. 2) which are located on the respective pole pieces and connected via wires 57 and a pair of conductors 58 and 59 to a suitable external source 60 of direct current. The junction points between the respective conductors 58 and 59 and the terminals of the field coil wires 57 are shown at 61. The illustrated motor is a 4-pole d-c machine, and in between the four exciting field poles it is customary practice to locate smaller pole pieces for commutating field coils which are connected in series with the armature windings.

FIG. 2 also shows a gear 63 on the rotable shaft 31 of the motor M. To sense the speed (revolutions per minute) of the motor, a pickup coil 64 is physically disposed closely adjacent to the teeth on the perimeter of the gear 63. The pickup coil 64 is connected through an electrical coupler 65 and a 2-wire cable 66 to suitable means 67 responsive to the frequency of electrical pulses that are induced in the pickup coil 64 as successive teeth on the gear 63 move past the coil. The frequency of such pulses will be directly proportional to the speed of the motor.

Figure 3:
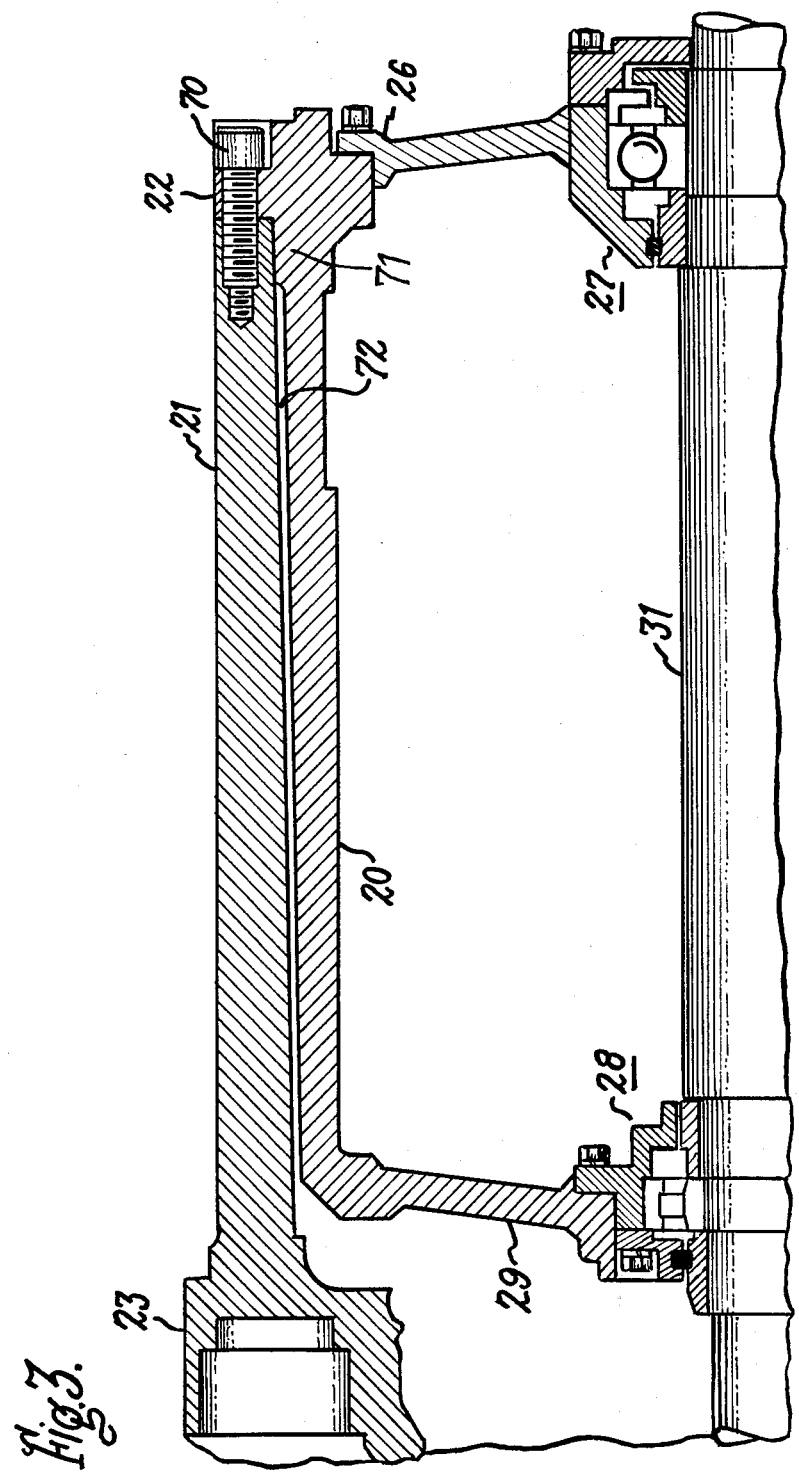
FIG. 3 is a simplified, not-to-scale view of a longitudinal section of one-half of the stator yoke assembly of the motor.

In FIG. 3, which is a longitudinal section of the top half of the generally symmetrical stator yoke assembly, the inner member 20 of the yoke is shown concentrically nested inside the cooperating outer member 21 to which it is removably joined by means of a ring of socket head bolts that extend through the annular flange 22 on the outboard or proximal end of the member 20 into tapped holes in the corresponding end of the member 21. Only one such mounting bolt 70 can be seen in FIG. 3. This figure has been simplified by omitting the pole pieces and field coils inside the inner member 20 and by omitting the rotor core, the armature coils, and the commutator on the rotor shaft 31. The outside diameter of the inner member 20 is nearly the same as the axial length of this member, but some of the transverse (i.e., radial) dimensions of the stator yoke are not to scale in FIG. 3, in order to illustrate a structural feature of the present invention which will now be described.

In accordance with this invention, except for a predetermined section 71 adjoining its proximal end, the outside convex surface of the inner member 20 is normally spaced by a relatively small gap 72 (e.g., 10 mils or less) from the cooperating concave inside surface of the outer member 21. The purpose of this annular gap is to minimize the risk that, due to fretting or corrosion, the inner member will become seized or stuck in the outer member. In addition, the cylindrical walls of the inner and outer members 20 and 21 are tapered so that the outside diameter of the inner member 20 at its inboard or distal end (and the corresponding inside diameter of the outer member 21) is less than the outside diameter of the inner member (and the inside diameter of the outer member) near its proximal end. This taper, which preferably is one-half of one degree with respect to the axial centerline of the stator yoke, facilitates the installation and removal of the inner member 20. By correspondingly tapering both the outside surface of the inner member 20 and the inside surface of the outer member 21, the normal gap 72 between these members is maintained substantially uniform in the axial direction.

In the illustrated embodiment, the external surface of the predetermined section 71 of the inner member 20 is not tapered. This right-cylindrical section 71 has a longitudinal dimension of approximately two inches, and its outside diameter is virtually the same as the inside diameter (e.g., 33.5 inches) of the corresponding section of the outer member 21 adjoining the outboard end of the stator yoke. A rabbet joint is thereby formed between the inner member and the outboard end of the outer member. As a result, the inner member fits snugly in the outer member in the vicinity of its proximal end. Due to the circumferential gap 72 that normally separates most of the outside surface of the inner member from the adjacent inside surface of the outer member, the inner member is in effect a cantilever that floats inside the outer member in the vicinity of its distal end. The effect of the gap 72 on the strength of the stator yoke and on its magnetic properties will be explained hereinafter in connection with the description of FIGS. 9 and 10.

Figure 4:
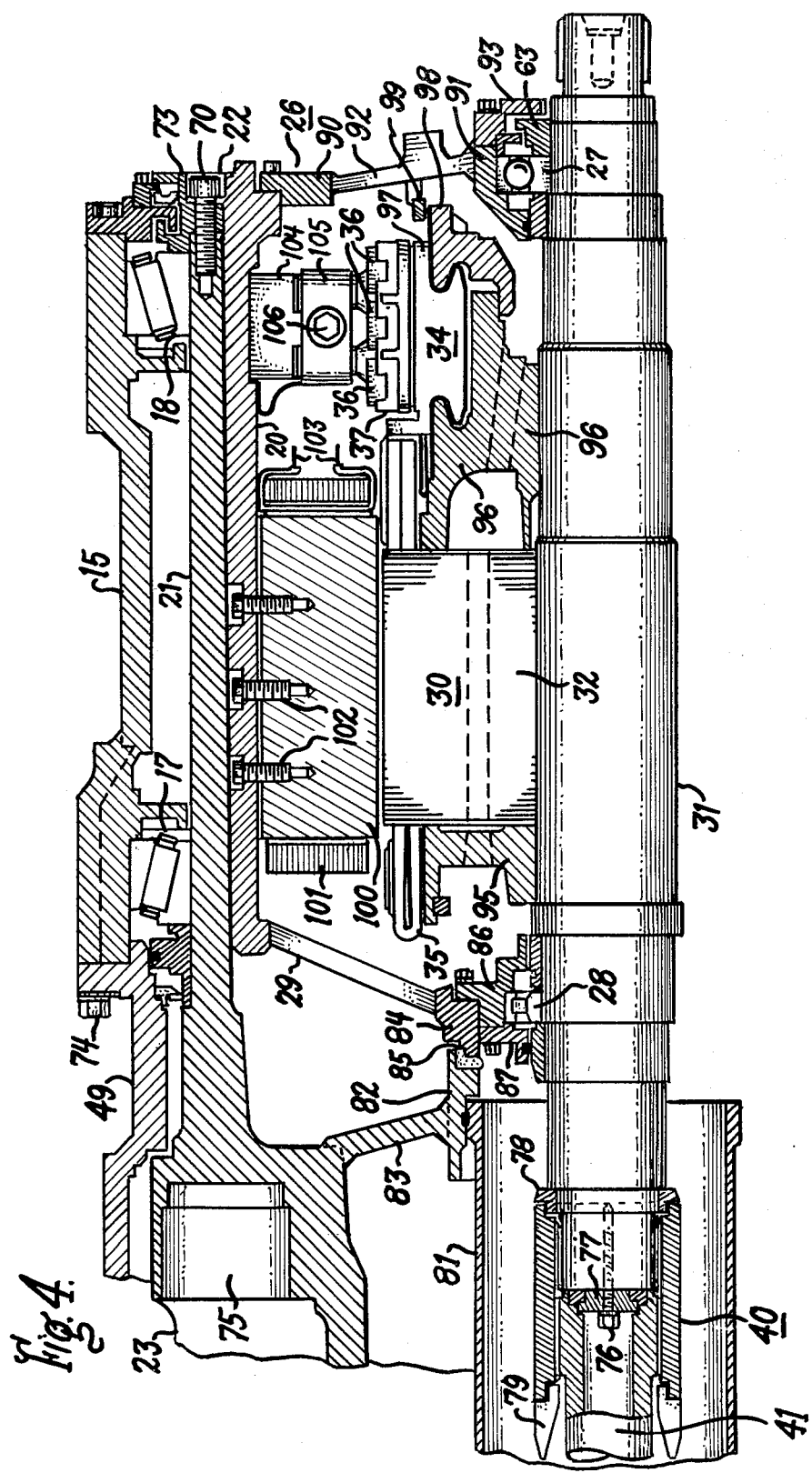
FIG. 4 is a more detailed longitudinal sectional view of the motor.

FIG. 4 shows more details of the stator yoke assembly 20,21 and the rotor 30. The outer member 21 of the yoke carries on its cylindrical outside surface the pair of large annular bearing assemblies 17 and 18 which in turn provide anti-friction rotatable support for the wheel hub 15. A thrust ring 73 for the bearing 18 is disposed between the flange 22 of the inner member 20 and the outboard end of the outer member 21. One end of the torque tube 49 is attached to the inboard side of the wheel hub 15 by means of bolt(s) 74. Through the previously described speed-reducing gear train (see reference Nos. 42–46 in FIG. 1), the internal ring gear (shown at 48 in FIG. 1) at the inboard end of the torque tube 49 is drivingly coupled to the sun pinion shaft 41. The wheel's non-rotating frame structure 23, which is removably attached to the frame or body of the associated vehicle and which physically supports the inboard end of the outer member 21 of the stator yoke, has suitable provisions for mounting the three sets of planet shaft bearings (44 and 45) of the gear train; one such provision is a cylindrical pocket 75 in the sidewall of the frame structure 23, which pocket houses a planet shaft bearing 45 (omitted from FIG. 4).

As shown in FIG. 4, the sun pinion shaft 41 and the shaft 31 of the motor rotor 30 are disposed in coaxial relationship with one another, and their abutting ends are releasably coupled to each other by means of the splined drive ring 40 and a bolt 76. The bolt 76 extends through a hole in a retaining disc 77 held captive in the outboard end of the hollow shaft 41, and it is threaded into a tapped hole which is axially disposed in the inboard end of the shaft 31. The drive ring 40 has internal spline teeth that mesh with external spline teeth on the abutting ends of the respective shafts 31 and 41. The ring 40 is axially positioned by a collar 78 near the end of shaft 31, and it is tightly attached to this shaft by means of a shrink fit. However, there is a slip fit between the ring 40 and the shaft 41, and the drive ring easily uncouples from the sun pinion shaft upon removing the inner member 20 of the stator yoke from inside the cooperating outer member 21. Prior to such uncoupling action, the bolt 76 needs to be manually unscrewed from the rotor shaft 31 by a long-handled tool (not shown) which is inserted through the hollow center of the sun pinion shaft 41. The shaft 41 is accessible for this purpose through a suitable opening in the gear case cover (reference No. 50 in FIG. 1). To facilitate the coupling of the drive ring 40 and the shaft 41 upon inserting the inner member 20 into the outer member 21, a pilot sleeve 79 is attached to the inboard end of the ring 40.

The drive ring 40 and the sun pinion shaft 41 are surrounded by a tubular housing 81. The outboard end of the housing 81 fits snugly inside a short cylindrical bracket 82 which is coaxially suspended in the frame structure 23 of the wheel by means of three spoke-like struts 83, only one of which can be seen in FIG. 4. The outboard end of the bracket 82 registers with the annular hub 84 of four generally radial, spoke-like struts 29 which are respectively welded to the four quadrants of the perimeter of the distal end of the cylindrical inner member 20 of the stator yoke. With the inner member 20 nested inside the outer member 21, the hub 84 is spaced from the bracket 82 by a small annular gap which is filled with a ring of suitably pliant sealer material 85, such as closed-cell neoprene sponge. A housing 86 for the roller bearing assembly 28 is attached to the hub 84, and a bearing cap 87 is attached to the housing 86. At the proximal end of the inner member 20, the frame head 26 provides support for the ball bearing assembly 27, and the rotor shaft 31 in turn is rotatably supported by the coaxial bearing assemblies 27 and 28.

The frame head 26 comprises a metal ring 90 bolted to the outboard end of the inner member 20, a centrally disposed annular hub 91, four spoke-like struts 92 extending generally radially from the hub 91 to the respective quadrants of the ring 90, and a bearing cap 93. The gear 63 (see FIG. 2) is affixed to the shaft 31 inside the bearing cap 93. The hub 91 serves as a housing for the ball bearing assembly 27.

In the illustrated embodiment of the invention, the hollow cylindrical core 32 of the rotor 30 comprises a tack of thin laminae of magnetizable material affixed to the shaft 31 for rotation therewith, and the convex outside periphery of the core 32 includes a plurality of longitudinal slots (not shown in FIG. 4) in which the insulated armature coils 35 of the motor are wedged. The core 32 is disposed between an annular armature head 95 and an annular shell 96 on the shaft 31. The shell 96 provides support for a parallel array of commutator segments 97 that form the commutator 34, and the segments 97 are held in place by an annular commutator cap 98. The armature coils 35 are respectively connected to the commutator segments 97 in a conventional manner. A conventional flash ring 99 is attached to the struts 92 of the frame head 26 in a position overlying the lip of the commutator cap 98. A plurality of longitudinal holes or channels, indicated by broken lines in FIG. 4, are located in the core 32, the armature head 95, and the commutator shell 96 to provide openings for the cooling air that flows from the forced ventilation means (not shown) through the inner member 20 of the stator yoke.

FIG. 4 shows one of the pole pieces of magnetizable material that are mounted inside the inner member 20 in spaced relation to the core 32 of the rotor 30. The illustrated pole piece 100 is encircled by a multiple-turn insulated coil 101 which is one of the commutating coils of the motor. In the preferred embodiment of the invention, there are actually two pairs of commutating field poles interleaved with two pairs of exciting field poles, all of which are shown in FIG. 6. As can be seen in FIG. 4, the pole piece 100 is attached to the wall of the cylindrical inner member 20 by means of three bolts 102, the wall being counterbored so that the bolt heads are recessed below the outside surface of the member 20. In practice, the terminals 103 of the commutating coil 101 are connected in a circuit that conducts armature current, and when excited by such current the coil produces a field of magnetic flux in the stator yoke 20,21, in the pole piece 100, in the rotor core 32, and in the space between the core and the pole piece. Similarly, current in the exciting coils 56 (see FIG. 2) produces a field of magnetic flux in the stator yoke 20,21, in each pair of exciting pole pieces (not shown in FIG. 4), in the core 32, and in the space between the core and the associated pole pieces. See the description of FIG. 9 for further discussion of the magnetic flux path in the stator yoke.

FIG. 4 also illustrates one of the brush holders 37 that holds three carbon brushes 36 in sliding contact with the commutator segments 97 of the rotating commutator 34. The brush holder 37 is removably clamped to a brush holder support 104 by means of a bracket 105 and a bolt 106. The support 104 in turn is attached to the wall of the inner member 20, as is better shown in FIGS. 5 and 6.

To illustrate more structual and electrical details of the inner member 20 of the stator yoke assembly, a portion of its proximal or outboard end is shown in longitudinal section in FIG. 5 and in transverse section FIG. 6. FIG. 5 shows that the brush holder support 104 is attached to the cylindrical wall of the inner member 20 by a pair of bolts 108. It also shows that the speed sensor 64, which is connected via the coupler 65 to the electric cable 66, is mounted in the bearing cap 93 adjacent to the teeth of the gear 63. The cable 66 extends from the coupler 65 to the frequency responsive means (reference No. 67 in FIG. 2) located in the vehicle to which the wheel is attached. To reach the inboard end of the stator yoke assembly, the cable 66 passes from the coupler 65 between two of the struts 92, through a hole 109 in the inner member 20, and into a longitudinal groove or channel 110 that is cut in the outside surface of the wall of the member 20. The groove 110 provides a passageway between inner and outer members 20 and 21 for the cable 66. It also serves as a keyway for a metal key (see part 111 in FIG. 7) that protrudes inwardly from the inside of the cylindrical wall of the outer member 21 at a predetermined location on the perimeter of the outboard end of the stator yoke assembly. The key 111 is slotted as shown in FIG. 7 to accommodate the cable 66 while the inner member is being inserted into or removed from the outer member. This key and keyway ensure a desired angular orientation of the inner member 20 when inserted in the outer member 21.

In addition to the groove 110, there are three other longitudinal grooves or slots 112, 113, and 114 in the outside surface of the wall of the inner member 20. As is best seen in FIG. 6, these four grooves are positioned at about equally arcuately spaced points around the perimeter of the member 20, with each groove intersecting the centerline of a different one of the four exciting field coils 56. The groove 112 provides a passageway between the inner and outer members 20 and 21 for the armature current conductors 52 and 53 which interconnect the external source of current (reference No. 51 in FIG. 2) on the vehicle and the commutator brushes 36 of the motor. This groove terminates in a rectangular opening 115 in the wall of the inner member 20 near its proximal end. The insulated conductors 52 and 53 are cleated to the interior of the outer member 21 and pass through the opening 115 for connection to the brush cables 54 inside the member 20. In FIG. 8, which is an enlarged longitudinal section of the inner and outer member 20 and 21 in the region of the opening 115, a bolted connection between conductor 52 and a brush cable 54 is shown at 55. As can be seen also in FIG. 8, a recess or pocket 116 is formed in the outer member in an area of its wall that registers with the opening 115 so as to provide additional space for bolting and unbolting the junction 55.

The third groove 113 in the outside of the inner member 20 provides a passageway between the inner and outer members 20 and 21 for the field current conductors (58 and 59) which interconnect the external source of direct current (reference No. 60 in FIG. 2) on the vehicle and the exciting field coils 56 of the motor. This groove terminates in a rectangular opening 117 in the wall of the inner member 20 near its proximal end. The field current conductors are cleated to the interior of the outer member 21 and pass through the opening 117 for connection to the wires 57 of the exciting field coils inside the member 20. In FIG. 6 the junction points between the field current conductors and the terminals of the respective wires 57 are indicated at 61.

The fourth longitudinal groove 114 is available as a passageway between the inner and outer members 20 and 21 for fluid lines or conduits (not shown) that supply hydraulic fluid to a mechanical brake (not shown) that is conventionally provided on the outboard end of the rotor shaft 31.

Before removing the inner member 20 of the stator yoke from the cooperating outer member 21, it is necessary to disconnect, unbolt, and uncouple the varous electrical connections that are made at the junction points 55 and 61 and at the coupler 65. To assist in initiating withdrawal of the inner member 20 from the outer member 21, a plurality of tapped jackout holes are spaced around the perimeter of the flange 22 of the inner member 20. One such jackout hole is shown at 118 in FIG. 8. It is designed to accommodate one of the mounting bolts 70 that normally secure the falange 22 to the outboard end of the outer member 21. To remove the inner member, all of the mounting bolts 70 are first unscrewed from the outer member 21, and some of them are then screwed into the few jackout holes 118 until they engage the blind surface of the outboard end of the member 21. Further turning of the bolts will force the inner member 20 to slide axially out of the outer member 21.

As can be seen in FIG. 6, a pair of the brush holders 37 are respectively attached to opposite sides of each of two diametrically opposed brush holder supports 104 which in turn are bolted to the inside of the inner member 20. The rotor shaft 31, core 32, and commutator 34 have been omitted in FIG. 6, but the path circumscribed by the surfaces of the rotating commutator segments (97) is indicated by a broken line 119.

As was previously explained, the illustrated embodiment of the motor has two pairs of exciting field poles extending radially inwardly from the cylindrical wall of the inner member 20 of the stator yoke. Each of these poles comprises a pole piece of magnetizable material encircled by a multiturn coil 56. The exciting field pole pieces (reference No. 120 in FIGS. 9 and 10) have arcuate bases 121 (see FIG. 6) which are intimately bolted to the inside of the inner member 20, and their concave faces are spaced apart from the armature section of the rotor core 32 by an air gap (see FIG. 9). When the coils 56 are excited by direct current, a magnetic field is produced in each pole piece 120. In one application of the invention, the field strength will be on the order of 0.076 webers of useful magnetic flux per exciting field pole (corresponding to a magnetomotive force of approximately 15,600 ampere turns per pole) when the machine is operating at its maximum continuously rated load. The lines of magnetic flux in each pole will divide approximately equally between two paths comprising the regions of the stator yoke between adjacent pole pieces, the corresponding regions of the cylindrical rotor core 32, and the spaces between the rotor and the faces of the respective pole pieces. These flux paths are indicated in FIG. 9 by broken lines. Note that the longitudinal grooves in the exterior of the inner member 20 have been desirably located in areas of relatively low flux density, which areas are on the centerlines of the respective exciting pole pieces 120.

As is apparent in FIG. 9, in each of the stator yoke regions between associated pole pieces the flux path includes parallel first and second branches in the inner and outer members 20 and 21, respectively. The magnetic flux divides between these parallel branches, with some of the flux traversing the trivial gap between the inner and outer members and being carried by the second or outer branch. The wall of the inner member 20 is so thin that a substantial portion of the flux follows the branch in the outer member 21. By "substantial portion" we mean at least 25 percent and probably closer to 50 or 60 percent of the total amount of flux in the inter-polar path under conditions of maximum continuously rated electrical load. In one practical application of the invention, the average thickness of the cylindrical wall of the inner member 20 in the region between adjacent pole pieces 120 is approximately 1.3 inches, the average thickness of the outer member 21 in the same region is 1.8 inches, and the cross-sectional area of the first or inner branch of the flux path is less than 24 square inches. This area is such that the magnetic flux density in the first branch would be appreciably greater than an intrinsic saturation limit (typically 130 kilolines of flux per square inch for high permeability material) if the first branch alone were carrying all of the flux in the inter-polar path when the machine is operating at its maximum continuously rated load. However, since the additional branch in the outer member 21 carries a substantial portion of the inter-polar flux, the intrinsic saturation limit of the first branch is not exceeded by the portion of the total flux actually carried by that branch, and magnetic saturation of the inner member 20 is in fact avoided. Both the inner and outer members 20 and 21 are needed in combination to provide enough cross-section to carry all of the flux that will exist in the stator yoke when the motor is operating with full field strength to drive a wheel on a loaded truck.

In operation the lines of magnetic flux will actually divide between the inner and outer branches of the inter-polar flux path according to the ratio of the wall thicknesses of the inner and outer members 20 and 21, respectively. The gap 72 between these members is so small compared to the air gaps between pole faces and rotor core that its effect on the flux division is negligible. The inner member 20 is made thick enough to accommodate the recessed heads of the exciting field pole piece mounting bolts beneath the longitudinal grooves (110, 112, 113, 114) that are cut in the outside surface of this member, and the outer member 21 is made thick enough to retain its true cylindrical shape when the truck is unloaded and the inner member is removed. In the above-mentioned practical application of our invention, the wall of the outer member is approximately 40 percent thicker than the wall of the inner member in a transverse section through the centerlines of the exciting pole pieces (120), and consequently more than half of the total inter-polar flux will be carried by the outer member 21 when the motor has full field current.

FIG. 10 illustrates the deformation of the stator yoke assembly when the wheel is supporting a fully loaded truck. The normally round cylindrical wall of the outer member 21 is so thin that it flexes relatively easily when a full payload is placed in the body of the truck. In one practical application of the invention, the outer member has a thickness of approximately 1.75 inches and an outside diameter of 36.6 inches at a cross-section midway between the wheel hub bearing assemblies (17 and 18), and the axle of the wheel can be loaded with a weight of approximately 245,000 pounds. Consequently, if the outer member alone were stressed by that much axle weight it would be so deflected or flattened that the geometry of the stator yoke would change an undesirable amount (e.g. one percent) from its originally round condition. The resulting out-of-roundness would cause the individual bearings of the wheel hub bearing assemblies (17 and 18) to be non-uniformly loaded and possibly damaged, and it could undesirably distort the normally uniform gaps between the rotating armature of the motor and the respective faces of the exciting field pole pieces which are mounted inside the stator yoke assembly. However, after an initial small deflection (e.g. 10 to 15 mils) the bottom and top portions of the outer member 21 converge on the corresponding portions of the inner member 20, and thereafter the inner member stiffens or reinforces the outer member so that the resulting deformation of the stator yoke is actually within acceptable limits. Both the inner and outer members 20 and 21 are needed in combination to provide enough cross-section to carry all of the mechanical forces that will exist when the motor is assembled in a wheel on a fully loaded truck.

Under full load conditions, as is shown in FIG. 10, the cylindrical inner and outer members of the stator yoke are not round but instead are generally oval or elliptical. Accordingly, the term "cylindrical " is herein intended to describe a member having a transverse section that basically is round or circular but alternatively can be somewhat oval or elliptical.

As was previously explained, the inner member 20 of the stator yoke assembly can be readily removed from the outboard end of the outer member 21 for purposes of maintaining or repairing the armature and its bearings, the commutator, the field coils, and/or the brush holders. In practice this will be done only when the truck is unloaded. The relatively thin wall of the outer member 21 is sufficiently strong to resist appreciable deflection when supporting the wheel's proportionate share of the weight of an unloaded truck, which share is much less than (e.g., 30 percent) the axle weight of a fully loaded truck. After the motor has been serviced or repaired, the inner member 20 and the rotor 30 can be electrically tested in a suitable test fixture including a stationary outer member that duplicates the outer member 21 which remains attached to the truck frame.

While a preferred embodiment of the invention has been shown and described by way of example, many modifications will undoubtedly occur to persons skilled in the art. The concluding claims are therefore intended to cover all such modifications as fall within the true spirit and scope of the invention.

We claim:

1. For propelling a traction vehicle having a frame and a rotatable wheel, a dynamoelectric machine including;
    a. a stator yoke comprising (i) an outer hollow cylindrical member of relatively large diameter adapted to be secured to said frame and (ii) an inner hollow cylindrical member of smaller diameter nested generally concentrically inside said outer member, (iii) both of said members being made of magnetizable material, (iv) said inner member being removably mounted to the outboard end of said outer member and, when so mounted, having most of its convex outside surface normally spaced by a small gap from the cooperating concave inside surface of said outer member;
    b. means for rotatably supporting said wheel on the outside of said outer member;
    c. a rotor supported concentrically within said inner member so as to be rotatable with respect thereto, said rotor comprising a cylindrical core of magnetizable material disposed in spaced relation to said inner member;
    d. means including a speed-reducing gear train for mechanically coupling said rotor to said wheel; and
    e. means for producing a field of magnetic flux in said stator yoke and said core, the path of the flux in said yoke including parallel first and second branches in said inner and outer members, respectively, with said second branch carrying a substantial portion of said flux;
    f. said first branch of said flux path having a cross-sectional area such that the magnetic flux density in said first branch would be appreciably greater than an intrinsic saturation limit if said first branch alone were carrying all of the flux that is produced when said machine is operating at its maximum continuously rated load.

2. The machine according to claim 1, wherein said inner member is mounted as a cantilever inside said outer member, said inner member having a first end that fits snugly in the outboard end of said outer member and having an opposite end that floats inside said outer member.

3. The machine according to claim 1, wherein said inner member has an annular flange at one end thereof, said flange being bolted to said outboard end of said outer member.

4. The machine according to claim 1, wherein said field producing means comprises (i) a plurality of pairs of pole pieces mounted inside said inner member in spaced relation to said core and (ii) means including field coils for producing magnetic flux in each of said pairs of pole pieces, the region of said stator yoke between associated pole pieces providing said flux path.

5. A machine according to claim 4, wherein said core has a plurality of longitudinal slots around its outside periphery, and further comprising (i) armature windings wedged in said slots and (ii) means for electrically energizing said armature windings, said last-mentioned means including a commutator that rotates with said core and cooperating brushes mounted inside said inner member.

6. The machine according to claim 4, wherein said outside surface of said inner member has a longitudinal groove that provides a passageway between said inner and outer members for electrical connectors that are adapted to be connected between said field coils and an external source of exciting current.

7. The machine according to claim 1, wherein said outside surface of said inner member has at least one longitudinal groove that provides a passageway between said inner and outer members.

8. The machine according to claim 7 wherein said inner member has an opening through its cylindrical wall, said opening communicating with said passageway.

9. A machine according to claim 1, further comprising a metal key protruding radially inwardly from the cylindrical wall of said outer member, said outside surface of said inner member having a longitudinal groove that provides a keyway for said key.

10. The machine according to claim 2, wherein said outside surface of said inner cylindrical member is tapered so that the outside diameter of said opposite end is less than the outside diameter of said first end.

11. The machine according to claim 10 wherein said inside surface of said outer cylindrical member is tapered so that said gap is substantially uniform.

* * * * *

UNITED STATES PATENT AND TRADEMARK OFFICE
CERTIFICATE OF CORRECTION

PATENT NO. : 4,389,586
DATED : June 21, 1983
INVENTOR(S) : David L. Foster, John F. Haupt and Malcolm W. Waite It is certified that error appears in the above-identified patent and that said Letters Patent is hereby corrected as shown below:

Column 4, line 24, delete "stator yoke;" and substitute -- motor under conditions of light or no mechanical load on the axle of the wheel; and --

Signed and Sealed this

Tenth Day of July 1984

[SEAL]

Attest:

GERALD J. MOSSINGHOFF

Attesting Officer

Commissioner of Patents and Trademarks